US010113616B2

(12) United States Patent
Beck et al.

(10) Patent No.: US 10,113,616 B2
(45) Date of Patent: Oct. 30, 2018

(54) MULTI-SPEED TRANSMISSION IN PLANETARY DESIGN FOR A VEHICLE

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE); Josef Haupt, Tettnang (DE)

(73) Assignee: ZF Friedrichshafen AG, Friedrichshafen (DE)

(*) Notice: Subject to any disclaimer, the term of this patent is extended or adjusted under 35 U.S.C. 154(b) by 264 days.

(21) Appl. No.: 14/913,542

(22) PCT Filed: Jul. 22, 2014

(86) PCT No.: PCT/EP2014/065658
§ 371 (c)(1),
(2) Date: Feb. 22, 2016

(87) PCT Pub. No.: WO2015/024719
PCT Pub. Date: Feb. 26, 2015

(65) Prior Publication Data
US 2016/0201767 A1     Jul. 14, 2016

(30) Foreign Application Priority Data

Aug. 22, 2013    (DE) .................. 10 2013 216 607

(51) Int. Cl.
*F16H 3/66*      (2006.01)
(52) U.S. Cl.
CPC ....... *F16H 3/66* (2013.01); *F16H 2200/0065* (2013.01); *F16H 2200/2015* (2013.01);
(Continued)

(58) Field of Classification Search
None
See application file for complete search history.

(56) References Cited

U.S. PATENT DOCUMENTS 3,267,769 A * 8/1966 Tuck ......................... F16H 3/66
                                            475/276
4,531,428 A * 7/1985 Windish ................... F16H 3/66
                                            475/279

(Continued)

FOREIGN PATENT DOCUMENTS

DE    DE102009029156 A1    3/2011
FR         2233892 A5    1/1975

OTHER PUBLICATIONS

PCT International Search Report, dated Sep. 4, 2014.

*Primary Examiner* — Colby M Hansen
(74) *Attorney, Agent, or Firm* — Dority & Manning, P.A.

(57) ABSTRACT

A multi-speed transmission in planetary design for a vehicle having a transmission housing (10); a first shaft (1), the first shaft (1) being a drive (An); a second shaft (2), the second shaft (2) being an output (Ab); at least five planetary gear sets (RS1, RS2, RS3, RS4, RS5); at least seven additional shafts (3, 4, 5, 6, 7, 8, 9); and five shift elements (SE1, SE2, SE3, SE4, SE5). Through actuation of the shift elements, at least nine forward gears (G1, G2, G3, G4, G5, G6, G7, G8, G9) and at least one reverse gear (R) are realized. For the realization of each gear, two of the shift elements are open and at least three of the shift elements (SE1, SE2, SE3, SE4, SE5) are closed.

12 Claims, 3 Drawing Sheets

(52) U.S. Cl.
CPC ............. *F16H 2200/2043* (2013.01); *F16H 2200/2064* (2013.01); *F16H 2200/2094* (2013.01)

(56) References Cited

U.S. PATENT DOCUMENTS

| | | | |
|---|---|---|---|
| 4,742,733 A | 5/1988 | Schreiner | |
| 5,924,951 A * | 7/1999 | Winzeler | F16H 3/66 475/275 |
| 2005/0137050 A1* | 6/2005 | Winzeler | F16H 3/66 475/296 |
| 2007/0099741 A1* | 5/2007 | Klemen | F16H 3/66 475/280 |

* cited by examiner

| Gear | Engaged Shifting Elements | | | | |
|---|---|---|---|---|---|
| | SE1 | SE2 | SE3 | SE4 | SE5 |
| R | X | X | | | X |
| G1 | X | X | X | | |
| G2 | X | X | | X | |
| G3 | | X | X | X | |
| G4 | | X | | X | X |
| G5 | | X | X | | X |
| G6 | | | X | X | X |
| G7 | X | | X | | X |
| G8 | X | | | X | X |
| G9 | X | | X | X | |

MULTI-SPEED TRANSMISSION IN PLANETARY DESIGN FOR A VEHICLE

FIELD OF THE INVENTION

The present invention relates to a multi-speed transmission in planetary design for a vehicle.

BACKGROUND OF THE INVENTION

For example, publication DE 10 2009 029 156 A1 discloses a multi-speed transmission in planetary design. The multi-speed transmission includes a drive shaft, an output shaft, nine shafts, and, whereas, for the realization of nine forward gears and one reverse gear, at least five planetary gear sets and at least six shift elements. This results in a high design effort in the manufacturing of the known multi-speed transmission. Further, with each gear step, at least three of the six shift elements are necessarily open, resulting in a high proportion of internal transmission losses, such that consumption is disadvantageously increased.

SUMMARY OF THE INVENTION

The present invention is directed to a multi-speed transmission of the type described above, which, with a maximum number of gear steps, comprises the smallest possible number of shift elements and also features a very low level of consumption.

A multi-speed transmission is proposed, which realizes at least nine forward gears and at least one reverse gear with only nine shafts, five planetary gear sets and only five shift elements. The shifting logic according to the invention provides that, with each gear step, three of the five shift elements are closed, such that, for each gearshift, two shift elements are open, by which consumption is minimized. This also gives rise to a multi-speed transmission of simple construction, which can be produced cost-effectively.

From the shifting diagram underlying the multi-speed transmission according to the invention, it arises that all single gearshifts, or shifting processes between two adjacent gear steps, and double gearshifts are possible without group gearshifts, which means that, for realizing each gear step, only one of the shift elements involved must be actuated. In addition, several, preferably three, so-called "overdrive gears" are realizable, with which a transmission ratio is carried out in overdrive. It also arises from this that the sixth forward gear is a direct gear, which has a transmission ratio of i=1.

The provided planetary gear sets preferably can be negative planetary gear sets. It is also conceivable that positive planetary gear sets or other types of planetary gear sets are used.

At least one of the provided shift elements can be a positive-locking shift element, for example a claw clutch or a claw brake or the like. The other shift elements can be frictional-locking shift elements or the like, such as multi-disk clutches or multi-disk brakes. Preferably, two of the shift elements are brakes and three shift elements are clutches. It is also conceivable that only one of the shift elements is a brake and the other four shift elements are clutches.

The drive shaft and the output shaft of the proposed multi-stage transmission can be preferably arranged coaxially to each other. However, other arrangements of the drive and output can be provided.

BRIEF DESCRIPTION OF THE DRAWINGS

The present invention is further described below with reference to the drawings. The following is shown.

DETAILED DESCRIPTION

Figure 1:
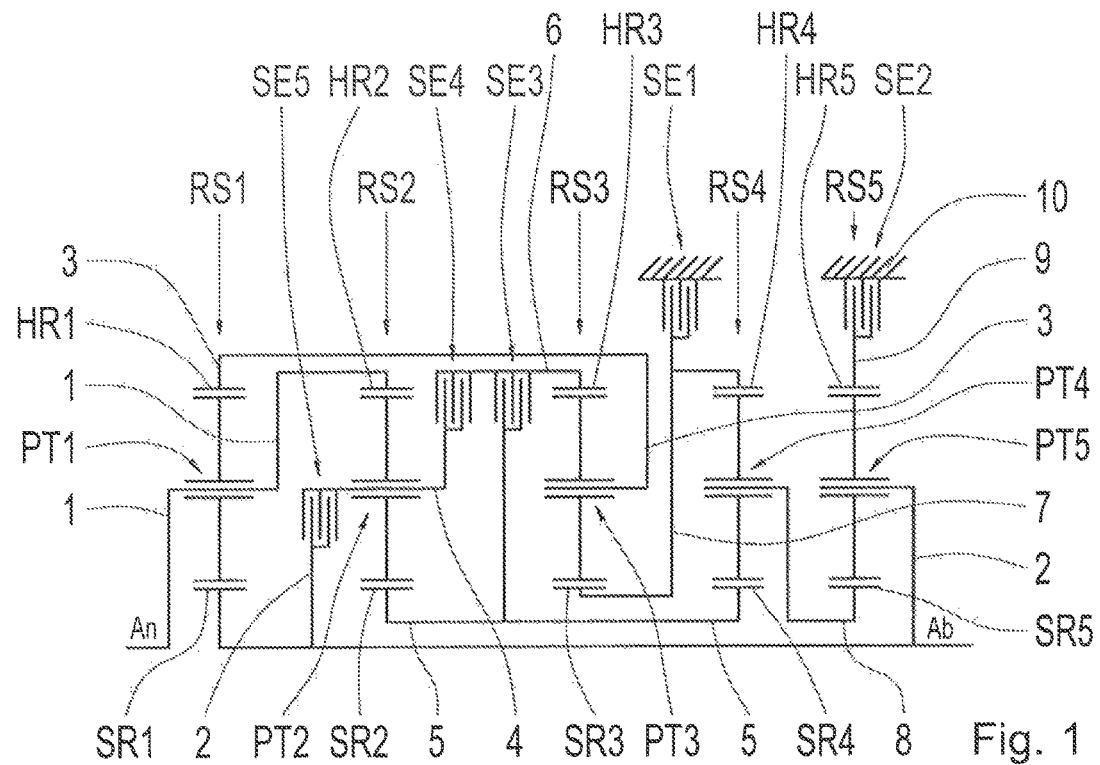
FIG. 1 is a first possible embodiment of a multi-speed transmission in accordance with the invention.

Reference will now be made to the embodiments of the invention, one or more examples of which are shown in the drawings. Each embodiment is provided by way of explanation of the invention, and not as a limitation of the invention. For example features illustrated or described as part of the one embodiment can be combined with another embodiment to yield still another embodiment. It is intended that the present invention include these and other modifications and variations to the embodiments described herein.

Figure 3:
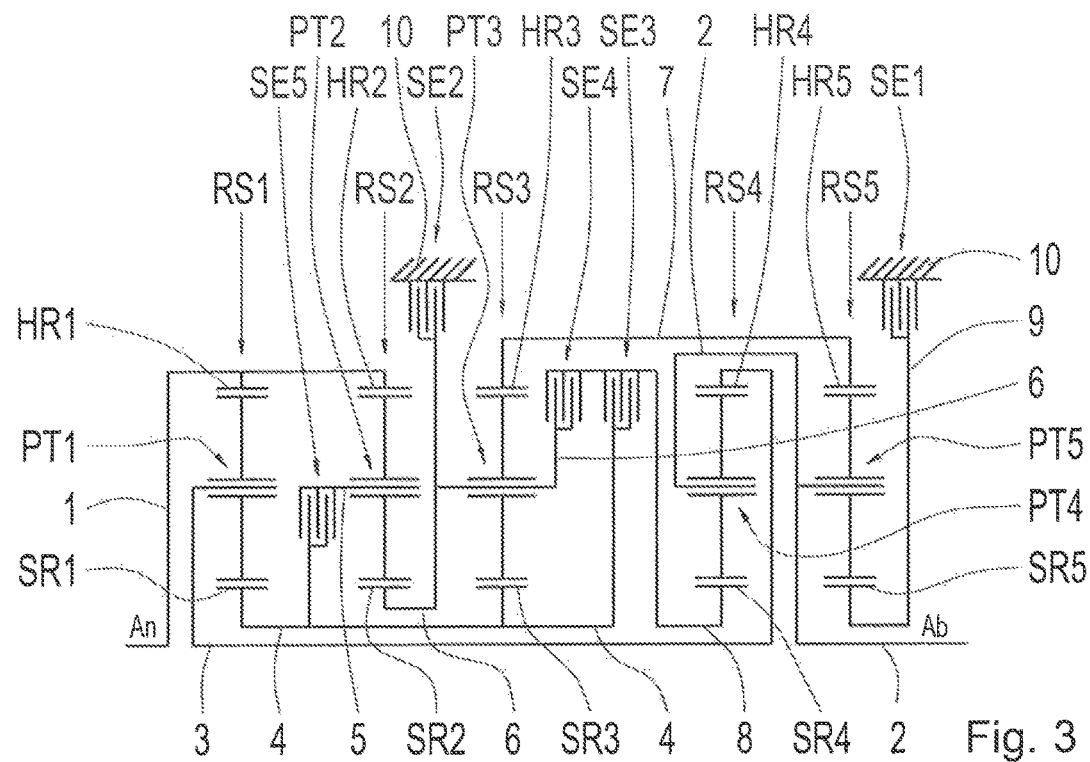
FIG. 3 is a third embodiment of the multi-speed transmission.
Figure 4:
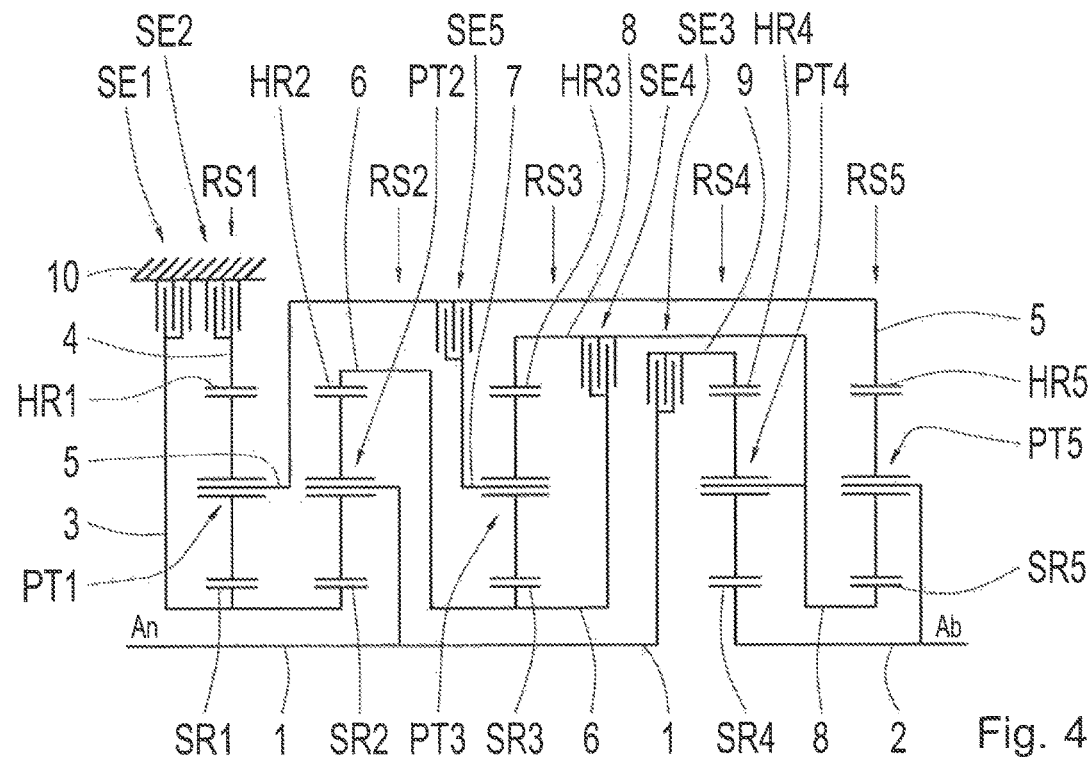
FIG. 4 is a fourth embodiment of the multi-speed transmission.
Figures 5, 6:
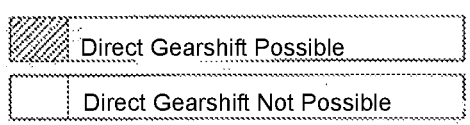
FIG. 5 is a shifting diagram for all embodiments according to FIGS. 1 to 4 indicated as an example.
FIG. 6 is a graphic presentation of the possible direct gearshifts for the proposed embodiments according to FIGS. 1 to 4.

FIGS. 1 to 4 show an example of a possible embodiment of the multi-speed transmission in planetary design, for example as an automated transmission or an automatic transmission, for a vehicle, in particular a motor vehicle, whereas FIGS. 5 and 6 indicate a shifting diagram and a direct shifting table for all embodiments of the multi-stage transmission.

Regardless of the respective embodiments, the multi-speed transmission comprises a housing 10, which is indicated schematically, with a first shaft 1 as the drive An, a second shaft 2 arranged as the output Ab and is coaxial to the drive An, and seven additional shafts, 3, 4, 5, 6, 7, 8, 9. Furthermore, a first planetary gear set RS1, a second planetary gear set RS2, a third planetary gear set RS3, a fourth planetary gear set RS4 and a fifth planetary gear set RS5 are provided, each of which is a negative planetary gear set. For shifting the provided gear steps, a first shift element SE1 being a brake, a second shift element SE2 being a brake, a third shift element SE3 being a clutch, a fourth shift element SE4 being a clutch and a fifth shift element SE5 being a clutch are provided. With the embodiments shown, by way of example, the shift elements are frictional-locking shift elements, but at least one positive-locking shift element is also usable.

It arises from the shifting diagram shown in FIG. 5 that, with the embodiments of the proposed multi-speed transmission shown in FIGS. 1 to 4 for realizing the first forward gear G1, the first shift element SE1, the second shift element SE2 and the third shift element SE3 are closed or actuated. For shifting the second forward gear G2, the first shift element SE1, the second shift element SE2 and the fourth shift element SE4 are closed. For shifting the third forward gear G3, the second shift element SE2, the third shift element SE3 and the fourth shift element SE4 are closed. For realizing the fourth forward gear G4, the second shift element SE2, the fourth shift element SE4 and the fifth shift element SE5 are closed. For shifting the fifth forward gear G5, the second shift element SE2, the third shift element SE3, and the fifth shift element SE5 are closed. For shifting the sixth forward gear G6, the third shift element SE3, the fourth shift element SE4 and the fifth shift element SE5 are closed. For shifting the seventh forward gear G7, the first shift element SE1, the third shift element SE3 and the fifth shift element SE5 are closed. For shifting the eighth forward gear G8, the first shift element SE1, the fourth shift element SE4 and the fifth shift element SE5 are closed. For shifting the ninth forward gear G9, the first shift element SE1, the third shift element SE3 and the fourth shift element SE4 are closed. For shifting the reverse gear R, the first shift element SE1, the second shift element SE2 and the fifth shift element SE5 are closed.

If arises from this that, for realizing each gear step, three of the five shift elements SE1, SE2, SE3, SE4, SE5 are closed. Both for the reverse gear R and for the first forward gear G1 and the second forward gear G2, the first and second shift elements SE1, SE2, respectively, are closed. All single gearshifts and double gearshifts are possible without group gearshifts; that is, it is always the case that the actuation of only one shift element is necessary for a gear change.

The direct shifting table according to FIG. 6 shows the possible direct gearshifts with the proposed embodiments of the multi-speed transmission. It arises from this that, from the reverse gear R, there can be a shift, directly without a group gearshift, into the first forward gear G1, into the second forward gear G2, into the fourth forward gear G4, into the fifth forward gear G5, into the seventh forward gear G7 and into the eighth forward gear G8. Further, from the first forward gear G1, there can be a shift, directly without a group gearshift, into the reverse gear R, into the second forward gear G2, into the third forward gear G3, into the fifth forward gear G5, into the seventh forward gear G7 and into the ninth forward gear G9. From the second forward gear G2, there can be a shift, directly without a group gearshift, into the reverse gear R, into the first forward gear G1, into the third forward gear G3, into the fourth forward gear G4, into the eighth forward gear G8 and into the ninth forward gear G9. Further, from the third forward gear G3, there can be a shift, directly without a group gearshift, into the first forward gear G1, into the second forward gear G2, into the fourth forward gear G4, into the fifth forward gear G5, into the sixth forward gear G6 and into the ninth forward gear G9. From the fourth forward gear G4, there can be a shift, directly without a group gearshift, into the reverse gear R, into the second forward gear G2, into the third forward gear G3, into the fifth forward gear G5, into the sixth forward gear G6 and into the eighth forward gear G8. From the fifth forward gear G5, there can be a shift, directly without a group gearshift, into the reverse gear R, into the first forward gear G1, into the third forward gear G3, into the fourth forward gear G4, into the sixth forward gear G6 and into the seventh forward gear G7. From the sixth forward gear G6, there can be a shift, directly without a group gearshift, into the third forward gear G3, into the fourth forward gear G4, into the fifth forward gear G5, into the seventh forward gear G7, into the eighth forward gear G8 and into the ninth forward gear G9. From the seventh forward gear G7, there can be a shift, directly without a group gearshift, into the reverse gear R, into the first forward gear G1, into the fifth forward gear G5, into the sixth forward gear G6, into the eighth forward gear G8 and into the ninth forward gear G9. From the eighth forward gear G8, there can be a shift, directly without a group gearshift, into the reverse gear R, into the second forward gear G2, into the fourth forward gear G4, into the sixth forward gear G6, into the seventh forward gear G7 and into the ninth forward gear G9. From the ninth forward gear G9, there can be a shift, directly without a group gearshift, into the first forward gear G1, into the second forward gear G2, into the third forward gear G3, into the sixth forward gear G6, into the seventh forward gear G7 and into the eighth forward gear G8. It also arises from this that the second shift element SE2 is only involved in a single gearshift, namely upon the gearshift from the fifth forward gear G5 into the sixth forward gear G6, the second shift element SE2 being a brake.

With the first embodiment of the multi-speed transmission shown in accordance with FIG. 1, the following gear set arrangement arises:

The first shaft 1 is connected to the planetary gear carrier PT1 of the first planetary gear set RS1 and to the ring gear HR2 of the second planetary gear set RS2. This means that the planetary gear carrier PT1 of the first planetary gear set RS1 are constantly and/or firmly connected to the ring gear HR2 of the second planetary gear set RS2 through the first shaft 1. The second shaft 2 is connected to the planetary gear carrier PT5 of the fifth planetary gear set RS5 and to the sun gear SR1 of the first planetary gear set RS1, whereas the second shaft 2 is connectable to the fourth shaft 4 through the fifth shift element SE5, the fifth shift element SE5 being a clutch. The third shaft 3 is connected to the ring gear HR1 of the first planetary gear set RS1 and to the planetary gear carrier PT3 of the third planetary gear set RS3. The fourth shaft 4 is connected to the planetary gear carrier PT2 of the second planetary gear set RS2, whereas the fourth shaft 4 is connectable to the sixth shaft 6 through the fourth shift element SE4, the fourth shift element SE4 being a clutch. With the first embodiment, the fifth shaft 5 is connected to the sun gear SR2 of the second planetary gear set RS2 and to the sun gear SR4 of the fourth planetary gear set RS4, whereas the fifth shaft 5 is connectable to the sixth shaft 6 through the third shift element SE3, the third shift element SE3 being a clutch. The sixth shaft 6 is connected to the ring gear HR3 of the third planetary gear set RS3, whereas the sixth shaft 6 is connectable to the fifth shaft 5 through the third shift element SE3 and to the fourth shaft 4 through the fourth shift element SE4. The seventh shaft 7 is connected to the sun gear SR3 of the third planetary gear set RS3 and to the ring gear HR4 of the fourth planetary gear set RS4, whereas the seventh shaft 7 is connectable to the housing 10 through the first shift element SE1 designed as brake. The eighth shaft 8 is connected to the planetary gear carrier PT4 of the fourth planetary gear set RS4 and to the sun gear SR5 of the fifth planetary gear set RS5. Finally, the ninth shaft 9 is connected to the ring gear HR5 of the fifth planetary gear set RS5, whereas the ninth shaft 9 is connectable to the housing 10 through the second shift element SE2, the second shift element SE2 being a brake.

Figure 2:
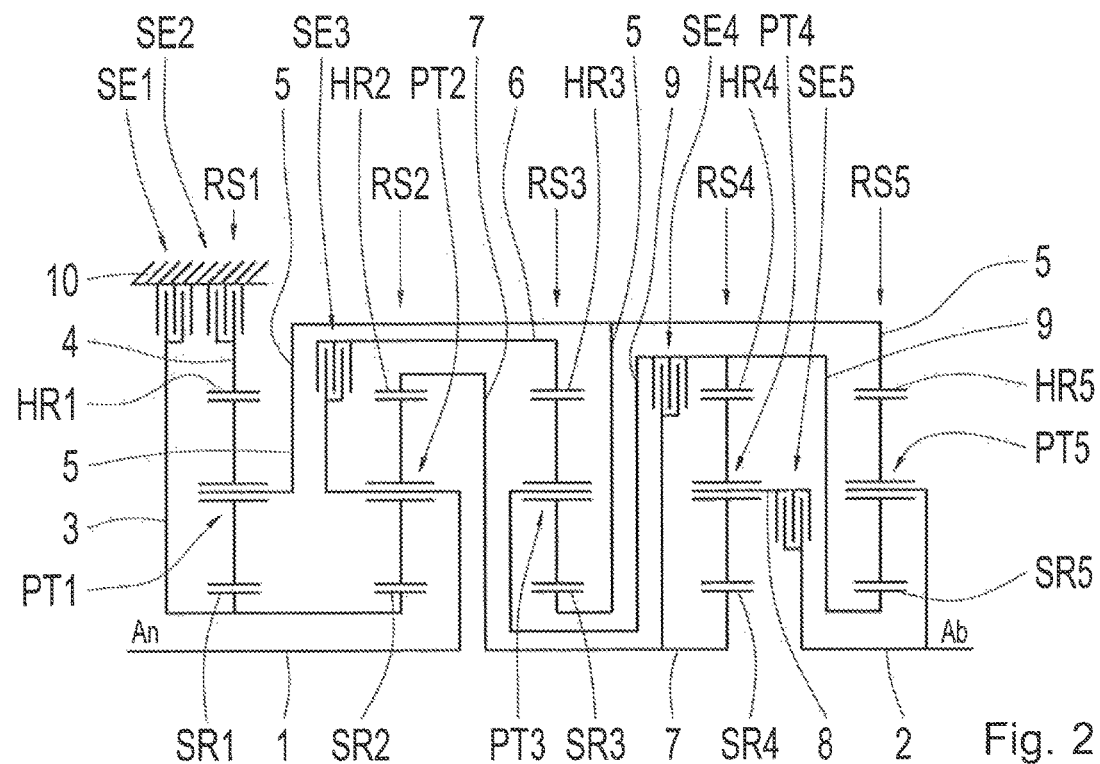
FIG. 2 is a second possible embodiment of the multi-speed transmission.

With the second embodiment of the multi-speed transmission shown in accordance with FIG. 2, the following gear set arrangement arises:

The first shaft 1 is connected to the planetary gear carrier PT2 of the second planetary gear set RS2. The second shaft 2 is connected to the planetary gear carrier PT5 of the fifth planetary gear set RS5, whereas the second shaft 2 is connectable to the eighth shaft 8 through the fifth shift element SE5 designed, the fifth shift element SE5 being a clutch. The third shaft 3 is connected to the sun gear SR1 of the first planetary gear set RS1 and to the sun gear SR2 of the second planetary gear set RS2, whereas the third shaft 3 is connectable to the housing 10 through the first shift element SE1, the first shift element SE1 being a brake. The fourth shaft 4 is connected to the ring gear HR1 of the first planetary gear set RS1, whereas the fourth shaft 4 is connectable to the housing 10 through the second shift element SE2, the second shift element SE2 being a brake. With the second embodiment, the fifth shaft 5 is connected to the planetary gear carrier PT1 of the first planetary gear set RS1, to the sun gear SR3 of the third planetary gear set RS3 and to the ring gear HR5 of the fifth planetary gear set RS5. The sixth shaft 6 is connected to the ring gear HR3 of the third planetary gear set RS3, whereas the sixth shaft 6 is connectable to the first shaft 1 through the third shift element SE3, the third shift element SE3 being a clutch. The seventh shaft 7 is connected to the ring gear HR2 of the second planetary gear set RS2 and to the sun gear SR4 of the fourth planetary gear set RS4, whereas the seventh shaft 7 is connectable to the ninth shaft through the fourth shift element SE4, the fourth shift element SE4 being a clutch. The eighth shaft 8 is connected to the planetary gear carrier PT4 of the fourth planetary gear set RS4, whereas the eighth shaft 8 is connectable to the second shaft 2 through the fifth shift element SE5. Finally, the ninth shaft 9 is connected to the planetary gear carrier PT3 of the third planetary gear set RS3 and to the ring gear HR4 of the fourth planetary gear set RS4 and to the sun gear SR5 of the fifth planetary gear set RS5.

With the third embodiment of the multi-speed transmission shown in accordance with FIG. 3, the following gear set arrangement arises:

The first shaft 1 is connected to the ring gear HR1 of the first planetary gear set RS1 and to the ring gear HR2 of the second planetary gear set RS2. The second shaft 2 is connected to the planetary gear carrier PT4 of the fourth planetary gear set RS4 and to the planetary gear carrier PT5 of the fifth planetary gear set RS5. The third shaft 3 is connected to the planetary gear carrier PT1 of the first planetary gear set RS1 and to the ring gear HR4 of the fourth planetary gear set RS4. The fourth shaft 4 is connected to the sun gear SR1 of the first planetary gear set RS1 and to the sun gear SR3 of the third planetary gear set RS3, whereas the fourth shaft 4 is connectable to the fifth shaft 5 through the fifth shift element SE5, the fifth shift element SE5 being a clutch and to the eighth shaft 8 through the third shift element SE3, the third shift element SE3 being a clutch. With the third embodiment, the fifth shaft 5 is connected to the planetary gear carrier PT2 of the second planetary gear set RS2. The sixth shaft 6 is connected to the sun gear SR2 of the second planetary gear set RS2 and to the planetary gear carrier PT3 of the third planetary gear set RS3, whereas the sixth shaft 6 is connectable to the housing 10 through the second shift element SE2, the second shift element SE2 being a brake. Furthermore, the sixth shaft 6 is connectable to the eighth shaft 8 through the fourth shift element SE4, the fourth shift SE4 element being a clutch. The seventh shaft 7 is connected to the ring gear HR3 of the third planetary gear set RS3 and to the ring gear HR5 of the fifth planetary gear set RS5. The eighth shaft 8 is connected to the sun gear SR4 of the fourth planetary gear set RS4, whereas the eighth shaft 8 is connectable to the fourth shaft 4 through the third shift element SE3 and to the sixth shaft 6 through the fourth shift element SE4. Finally, the ninth shaft 9 is connected to the sun gear SR5 of the fifth planetary gear set RS5, whereas the ninth shaft 9 is connectable to the housing 10 through the first shift element SE1, the first shift element SE1 being a brake.

With the fourth embodiment of the multi-speed transmission shown in accordance with FIG. 4, the following gear set arrangement arises:

The first shaft 1 is connected to the planetary gear carrier PT2 of the second planetary gear set RS2, whereas the first shaft 1 is connectable to the ninth shaft 9 through the third shift element SE3, the third shift element SE3 being a clutch. The second shaft 2 is connected to the sun gear SR4 of the fourth planetary gear set RS4 and to the planetary gear carrier PT5 of the fifth planetary gear set RS5. The third shaft 3 is connected to the sun gear SR1 of the first planetary gear set RS1 and to the sun gear SR2 of the second planetary gear set RS2, whereas the third shaft 3 is connectable to the housing 10 through the first shift element SE1, the first shift element SE1 being a brake. The fourth shaft 4 is connected to the ring gear HR1 of the first planetary gear set RS1, whereas the fourth shaft 4 is connectable to the housing 10 through the second shift element SE2, the second shift element SE2 being a brake. With the fourth embodiment, the fifth shaft 5 is connected to the planetary gear carrier PT1 of the first planetary gear set RS1 and to the ring gear HR5 of the fifth planetary gear set RS5, whereas the fifth shaft 5 is connectable to the seventh shaft 7 through the fifth shift element SE5, the fifth shift element SE5 being a clutch. The sixth shaft 6 is connected to the ring gear HR2 of the second planetary gear set RS2 and to the sun gear SR3 of the third planetary gear set RS3, whereas the sixth shaft 6 is connectable to the eighth shaft 8 through the fourth shift element SE4, the fourth shift element SE4 being a clutch. The seventh shaft 7 is connected to the planetary gear carrier PT3 of the third planetary gear set RS3. The eighth shaft 8 is connected to the ring gear HR3 of the third planetary gear set RS3 and to the planetary gear carrier PT4 of the fourth planetary gear set RS4 and to the sun gear SR5 of the fifth planetary gear set RS5. Finally, the ninth shaft 9 is connected to the ring gear HR4 of the fourth planetary gear set RS4.

Modifications and variations can be made to the embodiments illustrated or described herein without departing from the scope and spirit of the invention as set forth in the appended claims.

REFERENCE SIGNS

1 First shaft as a drive
2 Second shaft as an output
3 Third shaft
4 Fourth shaft
5 Fifth shaft
6 Sixth shaft
7 Seventh shaft
8 Eighth shaft
9 Ninth shaft
10 Housing
SE1 First shift element as a brake
SE2 Second shift element as a brake
SE3 Third shift element as a clutch
SE4 Fourth shift element as a clutch
SE5 Fifth shift element as a clutch
RS1 First planetary gear set
RS2 Second planetary gear set
RS3 Third planetary gear set
RS4 Fourth planetary gear set
RS5 Fifth planetary gear set
SR1 Sun gear of the first planetary gear set
PT1 Planetary gear carrier of the first planetary gear set
HR1 Ring gear of the first planetary gear set
SR2 Sun gear of the second planetary gear set
PT2 Planetary gear carrier of the second planetary gear set
HR2 Ring gear of the second planetary gear set
SR3 Sun gear of the third planetary gear set
PT3 Planetary gear carrier of the third planetary gear set
HR3 Ring gear of the third planetary gear set SR4 Sun gear of the fourth planetary gear set
PT4 Planetary gear carrier of the fourth planetary gear set
HR4 Ring gear of the fourth planetary gear set
SR5 Sun gear of the fifth planetary gear set
PT5 Planetary gear carrier of the fifth planetary gear set
HR5 Ring gear of the fifth planetary gear set
G1 First forward gear
G2 Second forward gear
G3 Third forward gear
G4 Fourth forward gear
G5 Fifth forward gear
G6 Sixth forward gear
G7 Seventh forward gear
G8 Eighth forward gear
G9 Ninth forward gear
R Reverse gear
i Transmission ratio

The invention claimed is:

1. A multi-speed transmission in planetary design for a vehicle, comprising:
    a transmission housing (10);
    a first shaft (1), the first shaft (1) being a drive (An);
    a second shaft (2), the second shaft (2) being an output (Ab);
    at least five planetary gear sets (RS1, RS2, RS3, RS4, RS5);
    at least seven additional shafts (3, 4, 5, 6, 7, 8, 9); and
    five shift elements (SE1, SE2, SE3, SE4, SE5), wherein through actuation of the shift elements, at least nine forward gears (G1, G2, G3, G4, G5, G6, G7, G8, G9) and at least one reverse gear (R) are realized; and
    wherein for the realization of each gear, two of the shift elements are open and at least three of the shift elements (SE1, SE2, SE3, SE4, SE5) are closed.

2. The multi-speed transmission according to claim 1, wherein:
    for shifting a first forward gear (G1) of the at least nine forward gears, a first shift element (SE1), a second shift element (SE2) and a third shift element (SE3) of the shift elements are closed;
    for shifting a second forward gear (G2) of the at least nine forward gears, the first shift element (SE1), the second shift element (SE2) and a fourth shift element (SE4) of the shift elements are closed;
    for shifting a third forward gear (G3) of the at least nine forward gears, the second shift element (SE2), the third shift element (SE3) and the fourth shift element (SE4) of the shift elements are closed;
    for shifting a fourth forward gear (G4) of the at least nine forward gears, the second shift element (SE2), the fourth shift element (SE4) and a fifth shift element (SE5) of the shift elements are closed;
    for shifting a fifth forward gear (G5) of the at least nine forward gears, the second shift element (SE2), the third shift element (SE3), and the fifth shift element (SE5) of the shift elements are closed;
    for shifting a sixth forward gear (G6) of the at least nine forward gears, the third shift element (SE3), the fourth shift element (SE4) and the fifth shift element (SE5) of the shift elements are closed;
    for shifting a seventh forward gear (G7) of the at least nine forward gears, the first shift element (SE1), the third shift element (SE3) and the fifth shift element (SE5) of the shift elements are closed;
    for shifting an eighth forward gear (G8) of the at least nine forward gears, the first shift element (SE1), the fourth shift element (SE4) and the fifth shift element (SE5) of the shift elements are closed;
    for shifting a ninth forward gear (G9) of the at least nine forward gears, the first shift element (SE1), the third shift element (SE3) and the fourth shift element (SE4) of the shift elements are closed; and
    for shifting a reverse gear (R) of the at least one reverse gear, the first shift element (SE1), the second shift element (SE2) and the fifth shift element (SE5) of the shift elements are closed.

3. The multi-speed transmission according to claim 1, wherein two of the shift elements (SE1, SE2, SE3, SE4, SE5) are brakes and three of the shift elements (SE1, SE2, SE3, SE4, SE5) are clutches.

4. The multi-speed transmission according to claim 1, wherein one of the shift elements (SE1, SE2, SE3, SE4, SE5) is a brake and four of the shift elements (SE1, SE2, SE3, SE4, SE5) are clutches.

5. The multi-speed transmission according to claim 1, wherein at least one shift element of the shift elements (SE1, SE2, SE3, SE4, SE5) is a positive-locking shift element.

6. The multi-speed transmission according to claim 1, wherein at least one of the at least five planetary gear sets (RS1, RS2, RS3, RS4, RS5) is a negative planetary gear set.

7. The multi-speed transmission according to claim 1, wherein a sixth forward gear (G6) of the at least nine forward gears is a direct gear with the transmission ratio of i=1.0.

8. The multi-speed transmission according to claim 7, wherein at least three of the at least nine forward gears are overdrive gears.

9. The multi-speed transmission according to claim 1, wherein:
    the first shaft (1) is connected to a planetary gear carrier (PT1) of a first planetary gear set (RS1) of the at least five planetary gear sets and to a ring gear (HR2) of a second planetary gear set (RS2) of the at least five planetary gear sets;
    the second shaft (2) is connected to a planetary gear carrier (PT5) of a fifth planetary gear set (RS5) of the at least five planetary gear sets and to a sun gear (SR1) of the first planetary gear set (RS1);
    the second shaft (2) is connectable to a fourth shaft (4) of the at least seven additional shafts through a fifth shift element (SE5) of the shift elements, the fifth shift element (SE5) being a clutch;
    a third shaft (3) of the at least seven additional shafts is connected to a ring gear (HR1) of the first planetary gear set (RS1) and to a planetary gear carrier (PT3) of a third planetary gear set (RS3) of the at least five planetary gear sets;
    the fourth shaft (4) is connected to a planetary gear carrier (PT2) of the second planetary gear set (RS2);
    the fourth shaft (4) is connectable to a sixth shaft (6) of the at least seven additional shafts through a fourth shift element (SE4) of the shift elements, the fourth shift element (SE4) being a clutch;
    a fifth shaft (5) of the at least seven additional shafts is connected to a sun gear (SR2) of the second planetary gear set (RS2) and to a sun gear (SR4) of a fourth planetary gear set (RS4) of the at least five planetary gear sets;
    the fifth shaft (5) is connectable to the sixth shaft (6) through a third shift element (SE3) of the shift elements, the third shift element (SE3) being a clutch;
    the sixth shaft (6) is connected to a ring gear (HR3) of the third planetary gear set (RS3);

the sixth shaft (6) is connectable to the fifth shaft (5) through the third shift element (SE3) and to the fourth shaft (4) through the fourth shift element (SE4);

a seventh shaft (7) of the at least seven additional shafts is connected to a sun gear (SR3) of the third planetary gear set (RS3) and to a ring gear (HR4) of the fourth planetary gear set (RS4);

the seventh shaft (7) is connectable to the housing (10) through a first shift element (SE1) of the shift elements, the first shift element (SE1) being a brake;

an eighth shaft (8) of the at least seven additional shafts is connected to a planetary gear carrier (PT4) of the fourth planetary gear set (RS4) and to a sun gear (SR5) of the fifth planetary gear set (RS5);

a ninth shaft (9) of the at least seven additional shafts is connected to a ring gear (HR5) of the fifth planetary gear set (RS5); and the ninth shaft (9) is connectable to the housing (10) through a second shift element (SE2) of the shift elements, the second shift element (SE2) being a brake.

10. The multi-speed transmission according to claim 1, wherein:

the first shaft (1) is connected to a planetary gear carrier (PT2) of a second planetary gear set (RS2) of the at least five planetary gear sets;

the second shaft (2) is connected to a planetary gear carrier (PT5) of a fifth planetary gear set (RS5) of the at least five planetary gear sets;

the second shaft (2) is connectable to an eighth shaft (8) of the at least seven additional shafts through a fifth shift element (SE5) of the shift elements, the fifth shift element (SE5) being a clutch;

a third shaft (3) of the at least seven additional shafts is connected to a sun gear (SR1) of a first planetary gear set (RS1) of the at least five planetary gear sets and to a sun gear (SR2) of the second planetary gear set (RS2);

the third shaft (3) is connectable to the housing (10) through a first shift element (SE1) of the shift elements, the first shift element (SE1) being a brake;

a fourth shaft (4) of the at least seven additional shafts is connected to a ring gear (HR1) of the first planetary gear set (RS1);

the fourth shaft (4) is connectable to the housing (10) through a second shift element (SE2) of the shift elements, the second shift element (SE2) being a brake;

a fifth shaft (5) of the at least seven additional shafts is connected to a planetary gear carrier (PT1) of the first planetary gear set (RS1), to a sun gear (SR3) of a third planetary gear set (RS3) of the at least five planetary gear sets and to a ring gear (HR5) of the fifth planetary gear set (RS5);

a sixth shaft (6) of the at least seven additional shafts is connected to a ring gear (HR3) of the third planetary gear set (RS3);

the sixth shaft (6) is connectable to the first shaft (1) through a third shift element (SE3) of the shift elements, the third shift element (SE3) being a clutch;

a seventh shaft (7) of the at least seven additional shafts is connected to a ring gear (HR2) of the second planetary gear set (RS2) and to a sun gear (SR4) of a fourth planetary gear set (RS4) of the at least five planetary gear sets;

the seventh shaft (7) is connectable to a ninth shaft (9) through a fourth shift element (SE4) of the shift elements, the fourth shift element (SE4) being a clutch;

an eighth shaft (8) of the at least seven additional shafts is connected to a planetary gear carrier (PT4) of the fourth planetary gear set (RS4);

the eighth shaft (8) is connectable to the second shaft (2) through the fifth shift element (SE5); and the ninth shaft (9) is connected to a planetary gear carrier (PT3) of the third planetary gear set (RS3) and to a ring gear (HR4) of the fourth planetary gear set (RS4) and to a sun gear (SR5) of the fifth planetary gear set (RS5).

11. The multi-speed transmission according to claim 1, wherein:

the first shaft (1) is connected to a ring gear (HR1) of a first planetary gear set (RS1) of the at least five planetary gear sets and to a ring gear (HR2) of a second planetary gear set (RS2) of the at least five planetary gear sets;

the second shaft (2) is connected to a planetary gear carrier (PT4) of a fourth planetary gear set (RS4) of the at least five planetary gear sets and to a planetary gear carrier (PT5) of a fifth planetary gear set (RS5) of the at least five planetary gear sets;

a third shaft (3) of the at least seven additional shafts is connected to a planetary gear carrier (PT1) of the first planetary gear set (RS1) and to a ring gear (HR4) of the fourth planetary gear set (RS4);

a fourth shaft (4) of the at least seven additional shafts is connected to a sun gear (SR1) of the first planetary gear set (RS1) and to a sun gear (SR3) of a third planetary gear set (RS3) of the at least five planetary gear sets;

the fourth shaft (4) is connectable to a fifth shaft (5) of the at least seven additional shafts through a fifth shift element (SE5) of the shift elements, the fifth shift element (SE5) being a clutch and to an eighth shaft (8) of the at least seven additional shafts through a third shift element (SE3) of the shift elements, the third shift element (SE3) being a clutch;

the fifth shaft (5) is connected to a planetary gear carrier (PT2) of the second planetary gear set (RS2);

a sixth shaft (6) of the at least seven additional shafts is connected to a sun gear (SR2) of the second planetary gear set (RS2) and to a planetary gear carrier (PT3) of the third planetary gear set (RS3);

the sixth shaft (6) is connectable to the housing (10) through a second shift element (SE2) of the shift elements, the second shift element (SE2) being a brake;

the sixth shaft (6) is connectable to the eighth shaft (8) through a fourth shift element (SE4) of the shift elements, the fourth shift element (SE4) being a clutch;

a seventh shaft (7) of the at least seven additional shafts is connected to a ring gear (HR3) of the third planetary gear set (RS3) and to a ring gear (HR5) of the fifth planetary gear set (RS5)

the eighth shaft (8) is connected to a sun gear (SR4) of the fourth planetary gear set (RS4);

the eighth shaft (8) is connectable to the fourth shaft (4) through the third shift element (SE3) and to the sixth shaft (6) through the fourth shift element (SE4);

a ninth shaft (9) of the at least seven additional shafts is connected to a sun gear (SR5) of the fifth planetary gear set (RS5); and the ninth shaft (9) is connectable to the housing (10) through a first shift element (SE1) of the shift elements, the first shift element (SE1) being a brake.

12. The multi-speed transmission according to claim 1, wherein:

the first shaft (1) is connected to a planetary gear carrier (PT2) of a second planetary gear set (RS2) of the at least five planetary gear sets;

the first shaft (1) is connectable to a ninth shaft (9) of the at least seven additional shafts through a third shift element (SE3) of the shift elements, the third shift element (SE3) being a clutch the second shaft (2) is connected to a sun gear (SR4) of a fourth planetary gear set (RS4) of the at least five planetary gear sets and to a planetary gear carrier (PT5) of a fifth planetary gear set (RS5) of the at least five planetary gear sets;

a third shaft (3) of the at least seven additional shafts is connected to a sun gear (SR1) of a first planetary gear set (RS1) of the at least five planetary gear sets and to a sun gear (SR2) of the second planetary gear set (RS2)

the third shaft (3) is connectable to the housing (10) through a first shift element (SE1) of the shift elements, the first shift element (SE1) being a brake;

a fourth shaft (4) of the at least seven additional shafts is connected to a ring gear (HR1) of the first planetary gear set (RS1);

the fourth shaft (4) is connectable to the housing (10) through a second shift element (SE2) of the shift elements, the second shift element (SE2) being a brake;

a fifth shaft (5) of the at least seven additional shafts is connected to a planetary gear carrier (PT1) of the first planetary gear set (RS1) and to a ring gear (HR5) of the fifth planetary gear set (RS5)

the fifth shaft (5) is connectable to a seventh shaft (7) of the at least seven additional shafts through a fifth shift element (SE5) of the shift elements, the fifth shift element (SE5) being a clutch;

a sixth shaft (6) of the at least seven additional shafts is connected to a ring gear (HR2) of the second planetary gear set (RS2) and to a sun gear (SR3) of a third planetary gear set (RS3) of the at least five planetary gear sets;

the sixth shaft (6) is connectable to an eighth shaft (8) of the at least seven additional shafts through a fourth shift element (SE4) of the shift elements, the fourth shift element (SE4) being a clutch;

the seventh shaft (7) is connected to a planetary gear carrier (PT3) of the third planetary gear set (RS3);

the eighth shaft (8) is connected to a ring gear (HR3) of the third planetary gear set (RS3) and to a planetary gear carrier (PT4) of the fourth planetary gear set (RS4) and to a sun gear (SR5) of the fifth planetary gear set (RS5); and that the ninth shaft (9) is connected to a ring gear (HR4) of the fourth planetary gear set (RS4).

\* \* \* \* \*